United States Patent [19]

Gos

[11] Patent Number: 4,956,194

[45] Date of Patent: Sep. 11, 1990

[54] METHOD FOR ACCELERATING THE AGING OF DISTILLATES

[76] Inventor: Bart Gos, 43 Cass St., Springfield, Mass. 01104

[21] Appl. No.: 483,441

[22] Filed: Feb. 21, 1990

[51] Int. Cl.$^5$ .............................................. C12H 1/22
[52] U.S. Cl. ...................................... 426/592; 426/489
[58] Field of Search ............... 426/592, 494, 425, 489, 426/330.3, 330.4, 429, 431, 11, 15

[56] References Cited

U.S. PATENT DOCUMENTS

| | | | |
|---|---|---|---|
| Re. 21,589 | 10/1940 | Krebs | 426/425 |
| 2,088,585 | 8/1937 | Chambers | 426/238 |
| 2,119,234 | 5/1938 | Krebs | 426/11 |
| 2,132,435 | 10/1938 | Reiman | 426/592 |
| 2,196,193 | 4/1940 | Chambers | 426/238 |
| 2,347,783 | 5/1944 | Krebs | 426/592 |
| 2,415,431 | 2/1947 | Krebs | 426/592 |
| 2,417,505 | 3/1947 | Krebs | 426/592 |
| 4,210,676 | 7/1980 | Dudar | 426/238 |
| 4,350,708 | 9/1982 | Ruiz de Palacios | 426/592 |
| 4,576,824 | 3/1986 | Gubiev | 426/592 |

FOREIGN PATENT DOCUMENTS

| | | | |
|---|---|---|---|
| 245900 | 5/1987 | Fed. Rep. of Germany | 426/592 |
| 1-157372 | 6/1989 | Japan | 426/592 |
| 464618 | 11/1975 | U.S.S.R. | 426/592 |

*Primary Examiner*—Carolyn Paden
*Attorney, Agent, or Firm*—H. Jay Spiegel

[57] ABSTRACT

The present invention relates to an improved method for accelerating the aging of distillates. In the inventive method, the addition of a tree bark either in a crushed form or as an extract is added to the distillate during the aging of the distillate in wooden barrels. Additonally, an apple concentrate may also be added to enhance the aging process. By adding these compounds and seasoning for a predetermined period of time, the inventive method produces distillates that have comparable qualities to distillates that have been seasoned for 12 years. A variety of types of tree barks may be utilized in the inventive method, including the bark from oak and willow trees.

16 Claims, No Drawings

METHOD FOR ACCELERATING THE AGING OF DISTILLATES

BACKGROUND OF THE INVENTION

The present invention relates to an improved method for accelerating the aging of distillates. Heretofore, alcoholic distillates such as whiskey have been aged in oak barrels or casks over long periods of time. During this aging time, the distillate reacts within the oak barrel to produce a higher quality distillate. The wooden barrels are usually stored in warehouses at a constant temperature, which significantly increases the cost of the final product. Given the long length of the aging period and the costs incurred, various methods and devices have been developed to speed up the aging process. However, Applicant is unaware of any prior art processes that teach or fairly suggest all of the features of the present invention including using a tree bark to accelerate the aging process.

The following United States patents are known to Applicant:

U.S. Pat. No. 2,119,234 to Krebs, et al. teaches a method of accelerating the aging process for whiskey and is seen to include the addition of oakwood shavings during the maturation process. Of course, the Krebs, et al. patent is different from that of the present invention in that there is no suggestion of using a tree bark to accelerate the aging process.

U.S. Pat. No. 4,350,708 to Ruiz de Palacios teaches a method of accelerating the aging of liqueurs by the addition of an extract produced from oakwood shavings to the distillate during the aging process. Again, the teachings of this patent do not include any suggestion to add a tree bark to a distillate during the maturation process.

U.S. Pat. No. 4,173,656 to Duggins teaches a method for aging liquor similar to the aforementioned patents, wherein particles of charred oakwood are added to the liqueur to accelerate the aging process. The teachings of this patent fail to suggest the addition of a tree bark or an apple concentrate to the distillate during the process of aging.

U.S. Pat. Nos. 2,207 to Oliver and 6,130 to Hopkins are only generally related to the method of distilling liquors.

SUMMARY OF THE INVENTION

The present invention relates to an improved method for accelerating the aging of distillates. The present invention includes the following interrelated aspects and features:

(a) In a first aspect, the method for accelerating the aging of distillates includes the step of the addition of a tree bark to a distillate during the aging of the distillate in a wooden barrel. A preferred tree bark may include bark from oak trees or the bark from willow trees. In addition to the tree bark, a quantity of apple concentrate may be added to the distillate to further accelerate the aging process. The addition of these components to an unrectified distillate and aging this distillate for a period of approximately one year has been shown to produce a distillate comparable in taste and quality to a distillate that has been aged for approximately twelve years.

(b) The addition of the tree bark may be done in a direct method whereby the tree bark is crushed and added directly to the wooden barrel during the aging process. Alternatively, an extract of the tree bark may be made and the extract added to the distillate during aging.

(c) The accelerated aging process using these tree barks may be utilized with various types of distillates, including grain distillates, wine distillates or fruit distillates. Additionally, the inventive process may be practiced on distillates having no aging performed thereon or distillates that have been aged for a short period of time.

Accordingly, it is a first object of the present invention to provide an improved method for accelerating the aging of distillates.

It is a further object of the present invention to provide a method of aging of distillates using a tree bark to accelerate the aging process.

It is a yet further object of the present invention to provide a method wherein the tree bark may be added directly to the distillate or may be added indirectly to the distillate in an extract form.

It is still a yet further object of the present invention to provide a method for accelerated aging of distillates that may be practiced upon a wide variety of distillates, unaged and aged.

These and other objects, aspects and features of the present invention will be better understood from the following specific description of the preferred embodiments.

SPECIFIC DESCRIPTION OF THE PREFERRED EMBODIMENTS

In the distillation process of various types of liquors, a vital step to produce a palatable product includes the aging or maturation step. In this step, the distillate is normally put into a wooden barrel and is aged over a period of years to produce a smooth, high quality distillate that may be consumed. In the prior art, methods have been employed to accelerate this aging process because of the extended length of time involved as well as the economic costs. In one method, it has been proposed to add oakwood shavings or particles into the wooden barrels to accelerate the aging process. It is to this type of acceleration process that Applicant's invention is drawn. Applicant would like to incorporate by reference the teachings contained in the book "Chemistry of Cognac" by Lafon, published in Paris by Bailliere in 1973 and 1978, which more fully explains the aging process of distillates including the specific chemistry involved.

Applicant has discovered that the aging process for distillates may be accelerated by the addition of the bark of trees to distillates that are to be aged or have been aged for a short period of time in wooden barrels. Additionally, Applicant has discovered that the aging process is accelerated by the addition of an apple concentrate along with the tree bark during the aging process. As will be described hereinafter, the addition of tree bark and apple concentrate to unrectified distillates and aging the mixture for about one year results in a distillate that has the same qualities as a distillate that has been aged in wooden barrels for about twelve years.

A preferred tree bark for the inventive process includes bark from oak trees or willow trees. Since most of the aging of distillates is now performed in oakwood barrels, the addition of oak bark provides components that are similar to the components that are provided in the aging process from the oakwood barrels. The willow bark also has similar components as the oakwood, with additional compounds that will be described hereinafter.

Regarding the bark from oak trees, Applicant has discovered that certain tree barks provide better aging characteristics than others. One type of tree bark useful in the accelerated aging process may include oak bark from the branches of young oak trees. It has been found that branches 5-6 centimeters in thickness from 2-4-year-old oak trees may be especially adaptable for the inventive process. It should be noted that the bark from branches of young oak trees should be dried in preparation for the aging process. If a drying step is necessary prior to adding the bark to the distillate, the drying temperature should not exceed 100 degrees Fahrenheit.

A second type of oak bark that is adaptable to the aging process may include the bark from oak tree trunks. This type of bark is best derived from oak trees that range in age from 80 to 300 years old.

It should be noted that when using tree bark from any source for the inventive accelerated aging process, bark having a contamination, mildew or signs or decay should not be used. In comparing barks from oakwood trees, it has been shown that when a solution has been prepared from crushed bark, the solutions derived from bark containing evidence of decay, mildew or lignification had a perceptable bitterness in taste as compared to solutions derived from bark without such types of contamination.

Concerning the addition of the apple concentrate to the distillate during the aging process, the apple concentrate may be derived from conventional methods that are well known in the art, such methods not intended to be an aspect of the present invention. A preferred apple to be used as a source for the apple concentrate may include sour apples. In particular, a sour apple variety cultivated in Poland, i.e., "Antonowka", has been utilized in the aging process. Of course, other sour apples such as Granny Smith or McIntosh may be used as the source of the apple concentrate.

The addition of the apple concentrate to the distillate during the aging process introduces the apple acid which is similar to the type present in oak trees and oakwood and which assists in respiration during the aging process. Typically, 100 grams of apple juice contains approximately 88 to 90 grams of water with the remaining extract (mass) containing the sugars, acids, solids, etc. from the apple juice. In the inventive process, normal apple juice is not sufficient in concentration to produce the desired apple acids necessary to render the addition of apple concentrate to the process effective. A preferred concentration of the apple juice for addition to the distillate ranges from about 65-68% by weight, i.e., 68 grams of extract per 100 grams of concentrate or about six times the concentration of a typical apple juice. Apple concentrates having this percentage by weight contain about at least 4% by weight of acid content. This amount of apple acid corresponds generally to the amount of acid formed in the distillates made by the traditional aging of distillates in barrel having a capacity of 250-500 liters within 10-12 years. Apple concentrate also introduces into the spirits a sugar, i.e., fructose, which is one of the main sugars found in aged spirits. It should be noted that one skilled in the art could readily obtain the preferred concentration of apple juice by merely concentrating or diluting an apple juice concentrate of any known concentration. The amount of apple juice concentrate added to the distillates may vary, but a preferred amount ranges up to about 2 liters of apple juice concentrate per liter of distillate to be aged.

In the actual aging process, the tree bark and apple concentrate may be added in different ways. In a first method, the tree bark may be crushed and added directly to the barrel with the apple concentrate. The crushed tree bark may be placed in a fabric such as chiffon or gauze and then put into the barrel. In this method, the contact between the distillate and the wood barrel should be at least about 20 $cm^2$ of wood barrel surface area to liter of distillate. If the area of contact is less than 20 $cm^2/l$, it is necessary to place in the barrel an appropriate amount of pieces of oak wood taken from old barrels that are no longer used for aging.

In the second method, an extract of the tree bark may be produced and the then formed extract added to the distillate for the aging process. The extract may be made in the following manner. A rectified rye spirit or unrectified spirit for the production of whiskey or wine distillate of strength 47% by volume of alcohol—94 proof in a quantity of about 700 liters should be used to infuse 100 kg of the crushed oak bark. The mixture should then be stirred or the distillate should circulate through the bark for 7 hours a day. After six days, this first extract should be poured into an oakwood vat. The same crushed oak bark should then be again infused with spirit or wine distillate in the quantity of 450 liters of strength, 70% volume alcohol—140 proof. This mixture should then be stirred or circulated as described above for 7 hours a day. After 14 days, this second extract should be poured into the oakwood vat and mixed with the first extract. This process should yield a total of approximately 1,000 liters of extract having a strength of approximately 55% volume alcohol —110 proof. In making this extract, rectified potato or grain spirits may be used as the distillate. After the extract has been made, it may be stored in oakwood vessels to improve the quality.

In the method of using an extract in the aging process, a surface area contact of about 60 $cm^2$ of wood barrel surface area per liter of distillate being aged should be maintained. In the method of using an extract, old oakwood barrels (previously used) must be used. This method is used normally when the barrel capacity for the aging process is less than 500 liters. When larger barrels are used, the direct method using a crushed oak bark addition to the distillate is preferred.

The method of the present invention may be practiced on distillates such as unrectified grain spirits made of rye or barley, wine distillates, or fruit distillates. Furthermore, the accelerated aging process may be practiced on unrectified fresh distillates or distillates that have been aged two, three or five years. In either case, the accelerated aging process produces an end product comparable to products aged some ten to twelve years with only approximately three months to about one year of aging.

In the actual process of maturing or aging distillates, the distillates extract from the oakwood barrels tanning agents, lignins and hemicellulose. Typically, the dry oakwood would contain about 45% cellulose, 25% hemicellulose, about 23% lignin, and up to about 15% extract substances with tanning agents. On the other hand, the oak bark may contain up to about 20% cellulose, up to about 17.5% hemicellulose, up to about 49% lignin, and up to about 30% extract substances with tanning agents. When comparing the oakwood to the oak bark, it is apparent that the oak bark may have nearly twice the content of tanning agents, lignin and extract substances. To demonstrate this difference, the same method of producing an extract of oak bark was used for both oakwood chips and crushed oak bark. After evaporating the extract from the oakwood chips, a dry mass of 3.681 g/l was obtained and evaporating the extract derived from the oak bark, a dry mass of 7.3975 g/l was obtained. Additionally, the oakwood extract contained 2.2 g/l of tanning agents, whereas the oak bark extract contained 4.45 g/l of tanning agents. As can be seen from this comparison, the oak bark extract is seen to contain twice the amount of tanning agents and dry mass as the oak tree extract.

During the maturation process, the transformation of the tanning agents, lignin and fatty acids in the distillate produce compounds which give the distillate the bouquet necessary to produce a high quality product. This transformation is aided by molds and fungi that originate on the oakwood barrels or the oak bark. The same kind of mildew found on the oakwood barrels is present on the oak bark. The enzymes associated with this mildew retain part of their activity even when the alcohol content of 140 proof distillate is used during the aging process.

Regarding the tanning agents found in oakwood and oak bark, these tannins include the tannins of gallic acid, catechol acid, etc. This is an indefinite group of tanning agents containing gallotannins and flobotannins as well as products of their decay. Among the characteristic non-tannic components associated with the aging process there is found cyclic alcohol-quercit and quercitron belonging to the type of Vitamin P. These compounds may be found in spirits that have been aged in oakwood barrels for many years. Comparing the oakwood to the oak bark, the oakwood generally contains more complex compounds. For example, in oak bark there is gallic acid, and in oakwood there is m-2-gallic acid. The m-2-gallic acid is of a tannin type with its esters and glicosides being stringent and bitter tasting substances. Only hydrolysis and oxidation of m-2-gallic acid gives the gallic acid which has a gentle and pleasant taste. During many years of seasoning of oakwood in the open air, the m-2-gallic acid divides itself into two particles of gallic acid by the enzymes emitted by the various mildews associated with the oakwood or bark, i.e., *asperqulis niger*. The fact that the simpler compounds already exist in the oak bark reduces in time the lengthy aging process for distillates in oakwood, wherein the more complex compounds found in oak trees must be broken down by oxidation and hydrolysis.

Furthermore, the lignin that occurs in oak bark is also in simpler fragments than the oakwood lignin. The products of the degradation of the oakwood lignin are formed in a biochemical way on the outer surface of the barrel which then penetrate through the layers of wood, wherein they encounter the spirit compounds. The content of the lignin in the oak and willow bark is approximately twice that which is contained in the oakwood. During the spirit aging process, the lignin gives off aromatic compounds of the vanillin type. In comparing the different amounts of lignin, an oakwood sawdust was subject to an extraction with 100% alcohol and was seen to give off lignin aromatic compounds of the vanillin type and vanillin itself after four years. In comparison, an extract based upon crushed oak bark from the branches of two-to-four-year-old oak trees using alcohol of 95% concentration caused the formation of lignin aromatic compounds of the vanillin type after only two months. An extract based upon the crushed oak bark from a tree trunk using 95% alcohol caused the formation of lignin aromatic compounds only after ten days.

Regarding the fatty acids, the fatty acids which are normally contained in the distillate, $C_5$-$C_{14}$ as well as their esters, are normally transformed by mildew enzymes into ketones. It is likely that the ketones shall occur to a larger extent and more quickly through aging in distillates with the addition of oak bark and apple concentrates due to the action of the already existing oxidized compounds and enzymes toward the existing main fatty acids. This acceleration in the aging process has been confirmed by practical application, wherein the accelerated aging process of the present invention has shown the same transformation of the fatty acids after only one year as compared to the traditional aging process of approximately twelve years. As is apparent, the increased lignin amount found in the oak bark contributes to the quicker formation of the aromatic vanillin compounds that contribute to the enhancement of the flavor of the distillate.

Several experiments have been conducted showing the comparisons between distillates aged according to the improved accelerated aging process as compared to distillates aged in oakwood barrels according to prior art methods. The first series of experiments used oak bark derived from 5-6 cm thick branches of 2-4-year-old oak trees. Using the direct addition method, 8.5 kg of this oak bark was mixed with 1,000 liters of 140 proof distillate and 2 liters of apple juice having a mass concentration of 68% by weight. The contact of the distillate in the wood barrel was approximately 20 $cm^2$/l. This experiment employed unrectified rye spirit, the same spirit that was used during aging in oak barrels having a capacity of 250-500 liters at an average temperature of approximately 57° F. The samples according to the present inventive method had undergone approximately one year of aging at a temperature of approximately 68° F. and the organoleptic estimation showed that this method was equivalent to the effect of aging the distillate for twelve years in 250-500 liter barrels at an average annual temperature of 57° F. The taste of the samples from the inventive method was better than that of the 12-year-old aged distillate. In the 12-year-old age distillate, the odor of ethyl acetate ester and acetic aldehyde was predominating. The samples of the inventive process were more abundant in less volatile odors due to the oak bark. The physical and chemical properties, i.e., acid content, content of dry mass, sugars and others, corresponds to about 14 to 20 years of aged distillate in oakwood barrels at an average temperature of 57° F.

Using the same oak bark, and the indirect method of the inventive process, approximately 95-100 liters of oak bark extract should be mixed with 1,000 liters of distillate and 2 liters of apple concentrate with the same concentration as aforementioned. The aging of this mixture should be carried out in old oakwood barrels of 250-500 liter capacity for approximately one year at an annual average temperature of 68° F. The quality of this aged distillate should be equivalent to that of a distillate aged conventionally for 12 years.

The inventive method using the same type of oak bark was also utilized with 120-140 proof distillates which were two years, three years, and five years old. The addition of 60 liters to 2-year-old distillate, 50 liters to 3-year-old distillate, and 40 liters to 5-year-old distillate of the oak bark extract and 2 liters of apple concentrate to 1,000 liters of the aforementioned distillate produced a ready product after only three months of seasoning. In this method, whiskey, brandy, calvados, or natural plum-vodka types may be used. Additionally, the color may be corrected by the use of caramel and the smell may be strengthened by adding approximately 0.5 liters of vanilla extract which contains 0.05 kg of vanilla per liter for every 1,000 liters of distillate.

As is well known in the art, the color and smell of distillates may be altered, if necessary, by adding caramel and a vanilla extract. The method of making of vanilla extract is well known in the art and is not considered an aspect of the present invention. Using the present inventive process, it is possible to avoid the addition of these compounds to distillates and still produce a high quality distillate.

Using the oak bark from 80-300-year-old oak tree trunks, and the direct addition method, only approximately 5 kg of crushed oak bark and 2 liters of apple concentrate for every 1,000 liters of 140 proof distillates are needed. Using a contact with the wood of 20 cm$^2$ per liter, the distillate is stirred several times during the approximately one year seasoning period. After the one-year aging period, the distillate is comparable to distillate aged for approximately 12 years.

Using the indirect method and the oak bark from the 80-300-year-old oak trees, 45 liters of oak bark extract and 2 liters of apple concentrate are added to 1,000 liters of 120 proof spirit. After one year of aging at an annual average temperature of 68° F. in old barrels having a capacity of 250-500 liters, the distillate obtained is comparable to distillates aged for approximately 12 years.

Using the same oak bark as described above, i.e. 80-300-year-old oak trees, bark extracts of amounts 20, 25 and 30 liters and 2 liters of apple concentrate were added to 1,000 liters of 5-year, 3-year and 2-year-old 120-140 proof distillates, respectively. After three months of seasoning, there should be obtained a product of distillate comparable in quality to that of distillates aged for 12 years.

In a further mode, the bark of willow trees which were about 50 years old was used. The willow bark should be taken from tree trunk lower parts, 2-3 cm thick. In the direct method, utilizing a wood surface contact of approximately 20 cm$^2$/l, approximately 9 kg of the crushed willow tree bark, and 2 liters of the apple juice concentrate of 68% by weight mass concentration were added to 1,000 liters of 140 proof distillate. The distillate with the willow bark mixed therein was stirred several times during the one year of aging period. After one year of aging at a temperature of approximately 68° F., the obtained distillate was equivalent to a distillate aged for 12 years.

In using the indirect method, a willow bark extract was made as described hereinabove, and approximately 100 liters of extract and 2 liters of apple concentrate were added to 1,000 liters of 120 proof distillate. After one year of aging at a temperature of approximately 68° F. in old barrels having a capacity of 250-500 liters, the obtained distillate was comparable to a distillate aged for 12 years. A willow bark extract was added in amounts of 50, 60 and 70 liters of extract along with 2 liters of apple concentrate to 1,000 liters of 5-year-old, 3-year-old, and 2-year-old distillates respectively. After 3 months of seasoning, a ready product of distillate was obtained.

The specified quantities of oak bark and willow bark are generally considered to be optimum values for the raw materials as obtained from trees grown in Poland. Oakwood from oak trees grown in Poland is of light color. There may occur some small differences while using oak bark from trees grown in the United States, but with the suggested amounts, the effects should not be significant to change the results as described hereinabove.

One of the advantages of an accelerated maturation process is the benefit in the economics associated with the production of the distillate. During the maturation process, the strength and volume of the distillate are diminished. The losses for a year generally range in the amounts of 1% of strength and 3% of volume. Consequently, a distillate that is aged for 10 years would have a significant amount of loss of strength and volume. These losses are reflected in the price of the as-produced product. With the accelerated aging process, these losses in strength and volume are greatly reduced, and consequently reflect in a favorable economic effect. Additionally, the decreased aging time also results in less sediments in the form of precipitated iron and copper because the tanning agents are already in oxidized form prior to the beginning of the aging process.

It should also be noted that the tree bark does not contain any compounds that are hazardous to human health. In fact, oak bark has been used to bake bread and as a source of tea in past years. The willow bark, Cortex Salicis, containing salicylic acid, has been the "aspirin" of our ancestors.

As such, an invention has been disclosed in terms of a preferred embodiment thereof which fulfills each and every one of the objects of the invention as set forth hereinabove and provides a new and improved method for accelerating the aging of distillates having great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A method of accelerating the aging of distillates in wooden barrels comprising the steps of:
   (a) adding a distillate to a wooden barrel;
   (b) adding an amount of tree bark in a sufficient quantity to accelerate the aging of said distillate; and
   (c) aging said mixture of distillate and oak bark for a period of time;
   (d) whereby said distillate after said aging step approximates the taste and quality of a distillate aged 10 to 12 years without an addition of a tree bark.

2. The method of claim 1, wherein said tree bark comprises oak bark.

3. The method of claim 2, wherein said oak bark comprises crushed oak bark.

4. The method of claim 2, wherein said oak bark comprises an extract of oak bark.

5. The method of claim 1, further comprising adding a concentrate of apple juice to said distillate prior to said aging step.

6. The method of claim 5, wherein said concentrate of apple juice has a mass concentration of approximately 65 to 68% by weight.

7. The method of claim 3, wherein said amount of crushed oak bark comprises up to about 8.5 kg of oak bark per 1000 liters of said distillate.

8. The method of claim 4, wherein said amount of oak bark extract comprises up to about 100 liters of said extract per 1000 liters of said distillate.

9. The invention of claim 1, wherein said tree bark comprises willow tree bark.

10. The method of claim 1, wherein said distillate is selected from the group comprising grain distillates, wine distillates and fruit distillates.

11. The method of claim 1, wherein said distillate comprises an unaged distillate or an aged distillate.

12. The method of claim 1, wherein said amount of concentrate of apple juice comprises up to about 2 liters of concentrate of apple juice per 1,000 liters of said distillate.

13. The invention of claim 8, wherein said willow tree bark comprises crushed willow tree bark.

14. The invention of claim 8, wherein said willow tree bark comprises an extract of willow tree bark.

15. The invention of claim 12, wherein said crushed willow tree bark comprises up to about 9 kg of crushed willow tree bark per 1000 liters of said distillate.

16. The method of claim 1, wherein said period of time ranges between about 2 months and about one year.

* * * * *